Patented Nov. 24, 1936

2,061,778

UNITED STATES PATENT OFFICE 2,061,778

COMPENSATING MECHANISM FOR THREAD CUTTING MACHINES

Heinrich Schicht, Huckeswagen, Germany, assignor to the firm: W. Ferd. Klingelnberg Söhne, Remscheid-Berghausen, Germany Application July 27, 1935, Serial No. 33,592
In Germany January 10, 1934

6 Claims. (Cl. 51—232)

This invention relates to compensating mechanism for thread cutting machines of the general type shown in Patent Number 2,027,621 granted Jan. 14, 1936. In machines of the type to which this invention relates, it is customary to rotate the work-piece about an axis along which it slides back and forth past a backing-off rest or tool support.

At the end of each stroke of the work-piece the tool support is withdrawn from the work-piece. The work-piece slide returns rapidly to the initial position. In this position the tool support is again pushed forward to working position and another cut is begun.

As regards special machines such as the above mentioned, on which great demands are made respecting accuracy and efficiency, this manner of working is disadvantageous, for if it is desired to reduce working time the result is a forced rapid return stroke. This rapid return stroke as well as the reversal and sliding forward again of the heavy tool rest causes high mass acceleration and therefore causes an exceedingly great demand on the gear parts. Further, on interception by the stops of the rapid reverse and return thrust of the heavy tool rest, shocks are unavoidable and impair the accuracy of the machine, quite apart from the idle time of the return stroke.

The present invention, therefore, comprises a device by which the rapid return stroke and reversal of the tool rest are rendered superfluous and by means of which attendant disadvantages such as mass acceleration and shocks are avoided. Consequently, the accuracy and cutting efficiency of the machine are increased considerably and the time required for cutting is reduced.

This problem is solved by providing an apparatus which equalizes the play occurring in the machine gears upon reversal of direction of travel of the work carriage. Therefore in both directions of travel the tool engages accurately with the threads being cut, and consequently cuts may be made in both directions of travel.

In the usual backing-off machines with rapid return strokes for instance, the tool is applied to the left flank of the tooth of the work-piece during the working stroke and works it.

At the end of the working stroke the machine is reversed and runs backwards, and now the work-piece travels in the opposite direction past the tool. In consequence of the play in the gearing between the drive of the lead screw and the drive of the work-piece spindle, for instance, the lead screw turns a little when changing the drive from the one direction to the other, while the work-piece spindle remains stationary. Thereby the work-piece table is slightly pushed towards the tool without the work-piece being able to adjust itself to this movement by a corresponding turn. Thus the tool can no longer touch the previously worked flank, but stands slightly off or is thrust entirely into the tooth.

According to the invention, the task of the equalizing or compensating apparatus is to adjust the work-piece slide with the work-piece opposite the tool in such a manner that the tool correctly touches the flank of the tooth being worked in both directions of work-piece travel.

This new apparatus for equalizing play is represented in the attached drawings.

Figure 1:
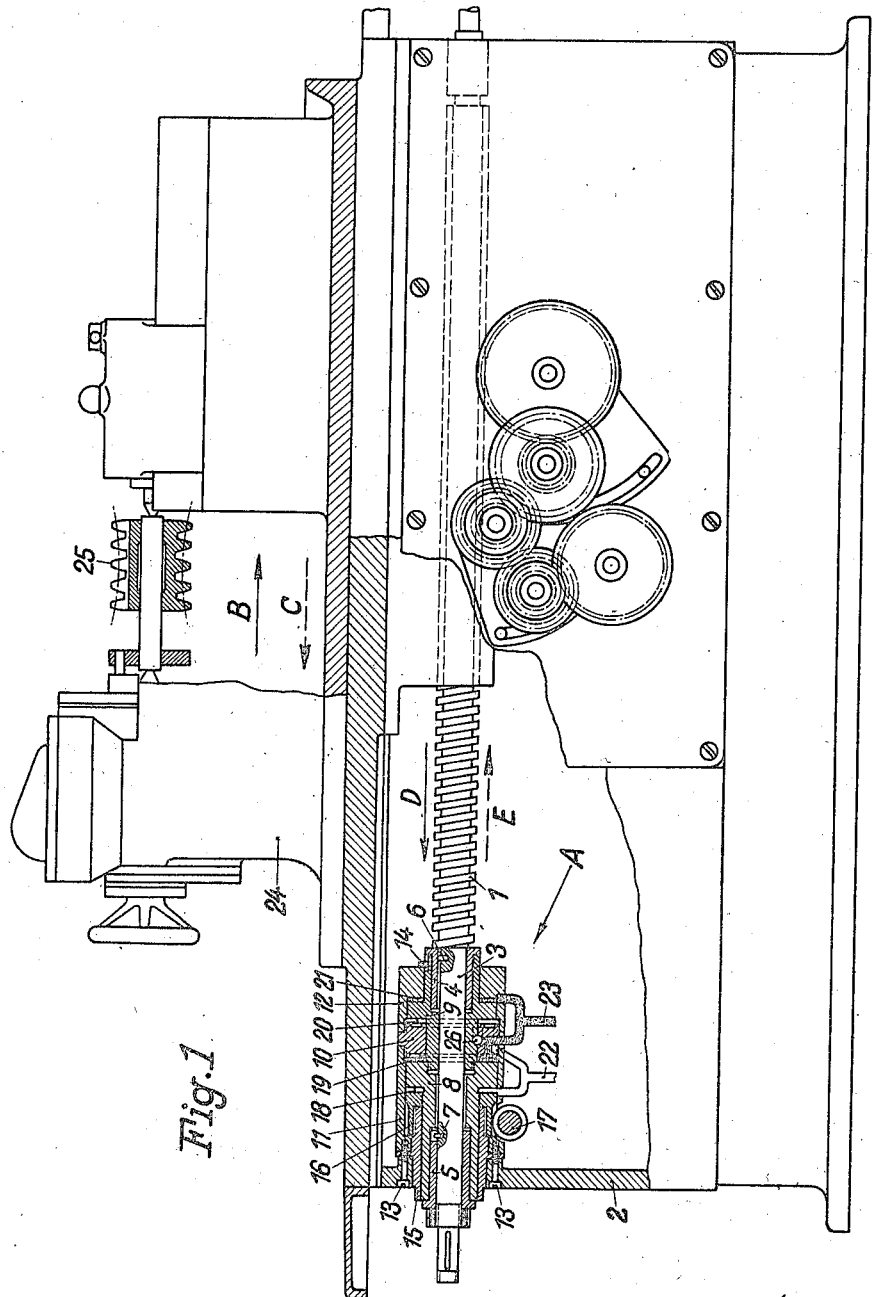
Fig. 1 shows a partial longitudinal section of the machine with the new equalizing apparatus.
Figure 2:
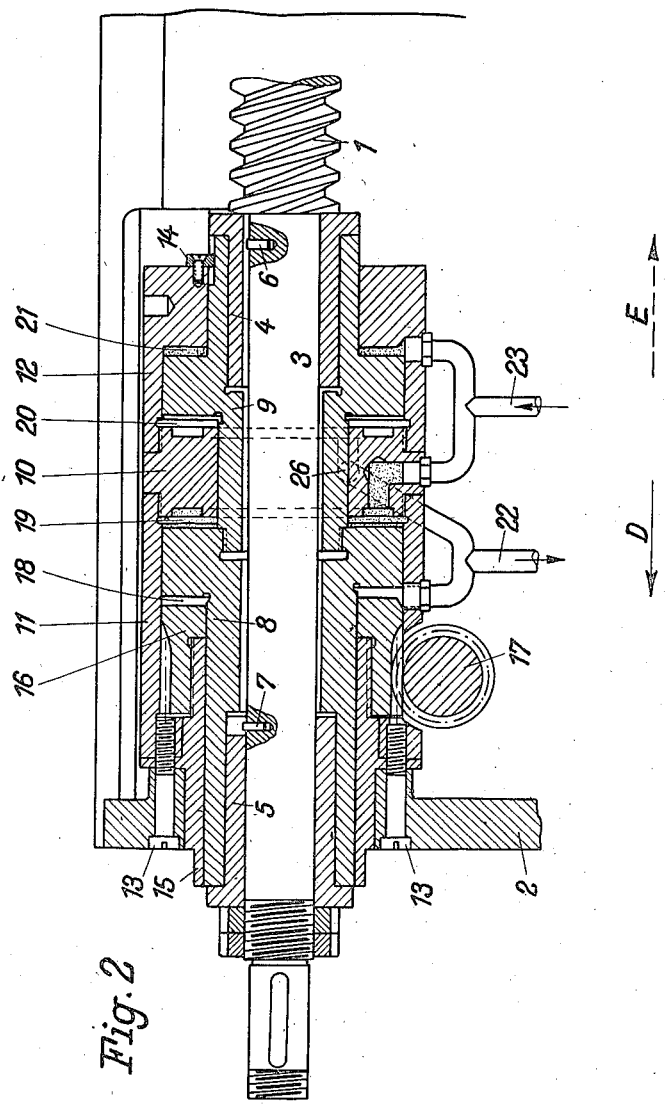
Fig. 2 shows a longitudinal section on a large scale of the equalizing apparatus.

The new equalizing apparatus A, Fig. 1, consists in the main of a forced lubrication piston composed of several parts cooperating with the lead screw 1 and a cylinder, the cylinder also being composed of several parts which are fastened to the bed 2 of the backing-off machine.

When the piston moves in the cylinder, the lead screw connected with the piston together with the work-piece table and the work-piece in relation to the tool, is pushed at the end of each stroke between adjustable limits, and thus the work-piece is adjusted relatively to the tool.

On the shaft 3 of the lead screw 1, the pressure-oil piston composed of two parts 8 and 9 is mounted on bushes 4 and 5 and prevented from rotating by the carrier pins 6 and 7. The middle part 10 projects between the two parts of the piston and is screwed to the twin cylinder jacket 11, 12. The cylinder jacket 11, 12 is fastened to the bed 2 by means of screws 13. By the assistance of tongue 14 the twin jacket 12 prevents the pressure-oil piston from rotating, so that it can only slide axially. The lead screw 1 with its bushes 4 and 5 turns in the pressure-oil piston 8, 9. As this piston is connected by the bushes and their flanges axially free of play to the lead screw, the piston, when thrown axially, takes the lead screw with it. A bush 15 and its flange is fastened by screws 13 to the bed 2. A nut 16 formed as a toothed wheel is screwed to bush 15 and prevented from rotating by the worm 17. Between the front surfaces of the piston part 8 and the nut 16 as well as the middle part 10, also between the piston part 9 and the cylinder part 12 as well as the middle part 10, there are spaces 18, 19, 20, 21 arranged as oil chambers which can be filled alternately in pairs with pressure oil. The oil is introduced and conducted away alternately through the pipes 22 and 23 by an oil-pump which is not shown in the drawings. A regulating valve of a known design controls the oil flow to and from pipes 22 and 23, and at the same time serves for reversing the movement of the table as well as the direction of rotation of cutter.

The method of operation of the apparatus is as follows:

While the machine is running, the lead screw 1 together with the bushes 4 and 5 turns freely in the bearings of the piston 8, 9 and slides the work table 24 with the cutter 25 past the tool-rest in either of directions B or C (Fig. 1).

While lead screw 1 slides the work table 24 in direction B, the pipe 23 of the apparatus and the oil chambers 19 and 21 are under pressure. Oil chambers 18 and 20 are then connected with the discharge by means of pipe 22. Owing to the pressure of the oil, the piston 8, 9 with the lead screw 1 is shifted in the direction of the arrow D, that is, in the direction of motion opposite to that of movement B of the work slide 24, until the contact with nut 16 takes place. By the help of worm 17 which can be rotated during the running of the machine by a hand wheel which is not shown in the drawings, the nut is adjustable axially in relation to the bush 15 in such a manner that the sliding direction of the lead screw corresponds to the amount of gear clearance to be equalized.

When the work slide 24 has reached its extreme position in direction B and has there been reversed to direction C by the action of the regulating valve, then at the same time the pressure-oil stream is conducted from pipe 23 to pipe 22, so that now pipe 23 is connected up with the discharge and pipe 22 connected with the pressure pump.

Thereby the pressure oil passes into the chamber 18 and through the duct 26 into chamber 20 and forces the piston 8, 9 with lead screw 1 in the direction E until the contact takes place with cylinder part 12 and middle part 10. This sliding direction also corresponds to the gear play to be equalized.

This reversal play is repeated at every change of stroke of the work slide 24 into its end positions and permits the working piece 25 to be worked in both directions of movement B and C.

The capacity of adjusting the stroke of the lead screw by the assistance of nut 16 and worm 17 makes it possible to work either only one flank of the work piece in both directions of movement B and C or the one flank in direction B and the other in direction C.

I claim:

1. In combination a thread cutting machine bed; a tool support on said bed; a work slide movable on said bed; means including a lead screw journalled in said bed and capable of limited axial movement in its journals for causing said slide to move in operative relation to said support; and means for moving said lead screw and work table in unison in either direction to compensate for play in said first-named means, and to cause said tool to register accurately with the threads on the work for either direction of travel of said slide.

2. In a machine for working tooth flanks of hobs, a machine bed having a tool support adjustably mounted thereon; a work slide reciprocable on said bed in operative relation to said tool support; a lead screw journalled in said bed and capable of limited axial movement in its journals for actuating said slide; and means for causing simultaneous compensating movement of said work slide and said lead screw with respect to said tool support to produce accurate registry between the tool and work during either direction of travel of said work slide.

3. In a machine for working tooth flanks of hobs, a machine bed having a tool support adjustably mounted thereon; a work slide reciprocable on said bed in operative relation to said tool support; a lead screw for actuating said slide, said screw being journalled in said bed and capable of limited axial movement in said journals; a nut carried in said bed and cooperating with said lead screw but held against axial movement; and means operable in timed relation to the movement of the work slide for causing simultaneous movement of the work slide and lead screw with respect to said tool support to produce accurate registry between the tool and work during travel of said slide in either direction.

4. In a machine for working tooth flanks of hobs, a machine bed having a tool support adjustably mounted thereon; a work slide reciprocable on said bed in operative relation to said tool support; a lead screw for actuating said slide said screw being journalled in said bed and capable of limited axial movement in its journals; a cylinder fixed to said bed; a piston in said cylinder and movable longitudinally with said lead screw, but restrained from rotation; and fluid pressure means for producing reciprocating movement of the piston, lead screw and slide with respect to the tool support to maintain accurate registry between the tool and work in either direction of work movement.

5. In a machine for working tooth flanks of hobs, a machine bed having a tool support adjustably mounted thereon; a work slide reciprocable on said bed in operative relation to said tool support; a lead screw for actuating said slide; said screw being journalled in said bed and capable of limited axial movement in its journals; a cylinder fixed to said bed; a piston in said cylinder and movable longitudinally with said lead screw, but restrained from rotation; and fluid pressure means operating in timed relation to the movement of said slide, for producing reciprocating movement of the piston, lead screw and slide with respect to the tool support to maintain accurate registry between the tool and work in either direction of work movement.

6. In a machine for producing threads on a work-piece which is reciprocable with respect to a fixed tool, a machine bed; a work slide reciprocable on said bed; a tool support on said bed; a lead screw for moving said slide, said screw being journalled in said bed and capable of limited axial movement in its journals; hydraulic means including a cylinder fixed to said bed and a piston movable longitudinally of said lead screw for causing simultaneous compensating movement of said lead screw and slide with respect to the tool; means for actuating said lead screw; and means controlled by change in direction of movement of said slide for producing adjusting movement of the lead screw.

HEINRICH SCHICHT.